US007891162B2

(12) United States Patent
Liao

(10) Patent No.: US 7,891,162 B2
(45) Date of Patent: Feb. 22, 2011

(54) RAKE WITH QUICK HANDLE CONNECTION

(76) Inventor: Dick Liao, 365 Oak St., Bridgewater, MA (US) 02324

( * ) Notice: Subject to any disclaimer, the term of this patent is extended or adjusted under 35 U.S.C. 154(b) by 0 days.

(21) Appl. No.: 12/154,772

(22) Filed: May 27, 2008

(65) Prior Publication Data
US 2009/0297258 A1 Dec. 3, 2009

(51) Int. Cl.
*A01D 7/00* (2006.01)
(52) U.S. Cl. .................. 56/400.18; 294/57; 403/361
(58) Field of Classification Search ............. 56/400.18, 56/400.19; 403/361, 356, 282, 322.2, 243, 403/251; 294/57, 49
See application file for complete search history.

(56) References Cited

U.S. PATENT DOCUMENTS

| 1,959,893 | A |   | 5/1934  | Bailie |
| 2,137,795 | A |   | 11/1938 | Bailie |
| 3,701,243 | A | * | 10/1972 | Durkee ............... 56/400.18 |
| 3,750,379 | A | * | 8/1973  | Huspen ............... 56/400.18 |
| 4,068,346 | A | * | 1/1978  | Binder ................ 16/110.1 |
| 4,224,786 | A |   | 9/1980  | Langlie et al. |
| 4,367,971 | A | * | 1/1983  | Coren ................. 403/330 |
| 4,406,559 | A |   | 9/1983  | Geertsema |
| 4,573,311 | A |   | 3/1986  | Ipema |
| 4,761,092 | A | * | 8/1988  | Nakatani ............. 403/104 |
| 4,848,073 | A |   | 7/1989  | Germain et al. |
| 4,892,434 | A |   | 1/1990  | Miller |
| 5,272,788 | A | * | 12/1993 | Gilstrap .............. 16/422 |
| 5,288,161 | A | * | 2/1994  | Graves et al. ........ 403/324 |
| 5,553,447 | A | * | 9/1996  | Hsu ................... 56/400.18 |
| 5,852,923 | A | * | 12/1998 | Wei ................... 56/400.18 |
| 5,927,779 | A |   | 7/1999  | Aquilina |
| 5,934,057 | A |   | 8/1999  | Daniels et al. |
| 6,328,361 | B1|   | 12/2001 | Spear |
| 6,435,754 | B1| * | 8/2002  | Canale ............... 403/109.2 |
| 6,663,309 | B2| * | 12/2003 | Zamansky et al. ..... 401/264 |
| 6,669,397 | B1| * | 12/2003 | Christion ........... 403/322.2 |
| 6,701,578 | B1| * | 3/2004  | Lu .................... 16/429 |
| 6,824,180 | B2|   | 11/2004 | Tomchak |
| 7,065,838 | B2| * | 6/2006  | Mitchell et al. ...... 16/436 |
| 7,134,264 | B2|   | 11/2006 | Wu |
| 7,653,970 | B1| * | 2/2010  | Lai .................. 16/422 |

* cited by examiner

*Primary Examiner*—Árpád Fábián-Kovács
(74) *Attorney, Agent, or Firm*—Pandiscio & Pandiscio

(57) ABSTRACT

A quick connect tool assembly including a tool head having a socket therein, and an elongated pole for insertion into the socket tool head to lock the tool head and the pole together. The assembly includes a detent fixed to an end of the pole and teeth projecting into the interior of the socket on the tool head, such that the teeth engage the tool head detent to lock the pole to the tool head.

3 Claims, 8 Drawing Sheets

RAKE WITH QUICK HANDLE CONNECTION

This invention relates to tools with sockets to receive handles, and more particularly to an improved Rake construction with a quick handle connection.

BACKGROUND OF THE INVENTION

Tools such as rakes and shovels commonly have a socket for receiving a pole that serves as a handle. The conventional mode of securing a wood pole in the socket is by means of one or more fasteners, e.g., metal screws or pins. That mode of connection is cheap, and strong. Commonly, that form of connection is permanent and, therefore, the handle is attached by the manufacturer. However, for reasons of convenience and to reduce costs, some manufacturers prefer to ship the tools without first attaching the handle, with the task of attaching the handle to the rake or shovel head being left to the distributor, ultimate seller (wholesaler or retailer), or end user. The task of attaching handles can be time consuming and costly, particularly if the person attaching the handle is required to use a special tool to secure the handle with fasteners. Also, the handle may not be attached properly, leading to complaints from the customers. There have been prior efforts to provide means for quickly and simply connecting a pole-type handle to a rake or shovel head, but the quick-connection designs been relatively costly to implement.

OBJECTS AND SUMMARY OF THE INVENTION

The primary object of the invention is to provide an inexpensive and reliable quick connection mechanism for attaching a pole-like handle to a tool head.

A second object of the invention is to provide a new and improved pole-receiving socket for a rake.

Another object of the invention is to provide a rake having an improved pole-receiving socket construction that embodies part of a quick-connection mechanism for a pole-type handle and also serves as a secure mount for a plurality of tine members.

A further object of the invention is to provide a socket for the purpose described that is made of relatively cheap, easy-to make sheet metal parts.

These and other objects are achieved by providing a tool head having a socket made of sheet metal parts, with one part comprising a plurality of teeth that project into the interior space of the socket and are arranged so as to an interlock with a detent attached to the peripheral surface off a pole that functions as a tool handle for the tool. The teeth are arranged so as to allow the detent to pass them when the pole is inserted into the socket, but to interfere with and block the detent when an effort is made to pull the pole out of the socket. In the preferred embodiment of the invention, the tool head is a multi-tine rake and the socket serves as a secure anchor or mount for the tines. Other features and advantages of the invention are described or rendered obvious by the following detailed specification of a preferred embodiment of the invention.

THE DRAWINGS

DETAILED DESCRIPTION OF THE INVENTION

Figure 1:
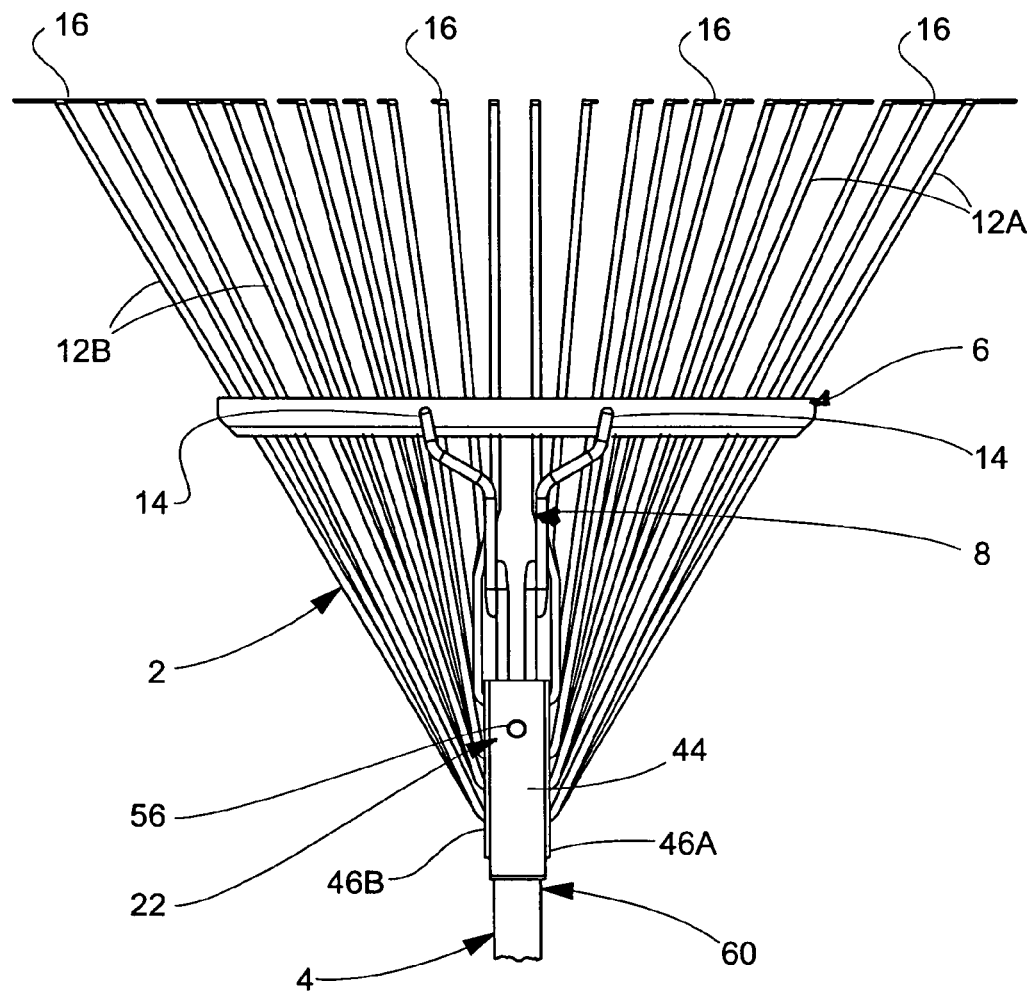
FIG. 1 is a fragmentary top view of a rake and handle embodying the invention.

Referring first to FIGS. 1-3, 5 and 8, the illustrated preferred embodiment of the invention is a rake in the form of a rake head that comprises a plurality of dual tine members 2 that are attached to a socket 4 for a pole handle 60 (FIG. 1) and are supported by a cross brace 6 and a U-shaped spring member 8. The dual tine members 2 are made from flat metal stock and are formed so as to have a generally U-shaped configuration comprising a center section 10A, 10B, 10C, 10D (FIG. 3) and two resilient tine sections 12A and 12B that diverge from one another with increasing distance from the center section 10A, 10B, 10C, 10D. The dual tine members vary in overall length and are arranged in groups. The front ends of tine sections 12A and 12B are bent to form rake fingers 16 (FIG. 1). The front ends of spring member 8 are attached to the cross-brace 6 (FIG. 1) and a U-shaped rear section 17 of spring member 8 (FIG. 3) is secured to socket 4. To the extent just described, this general form of rake construction is conventional and well known.

Figure 2:
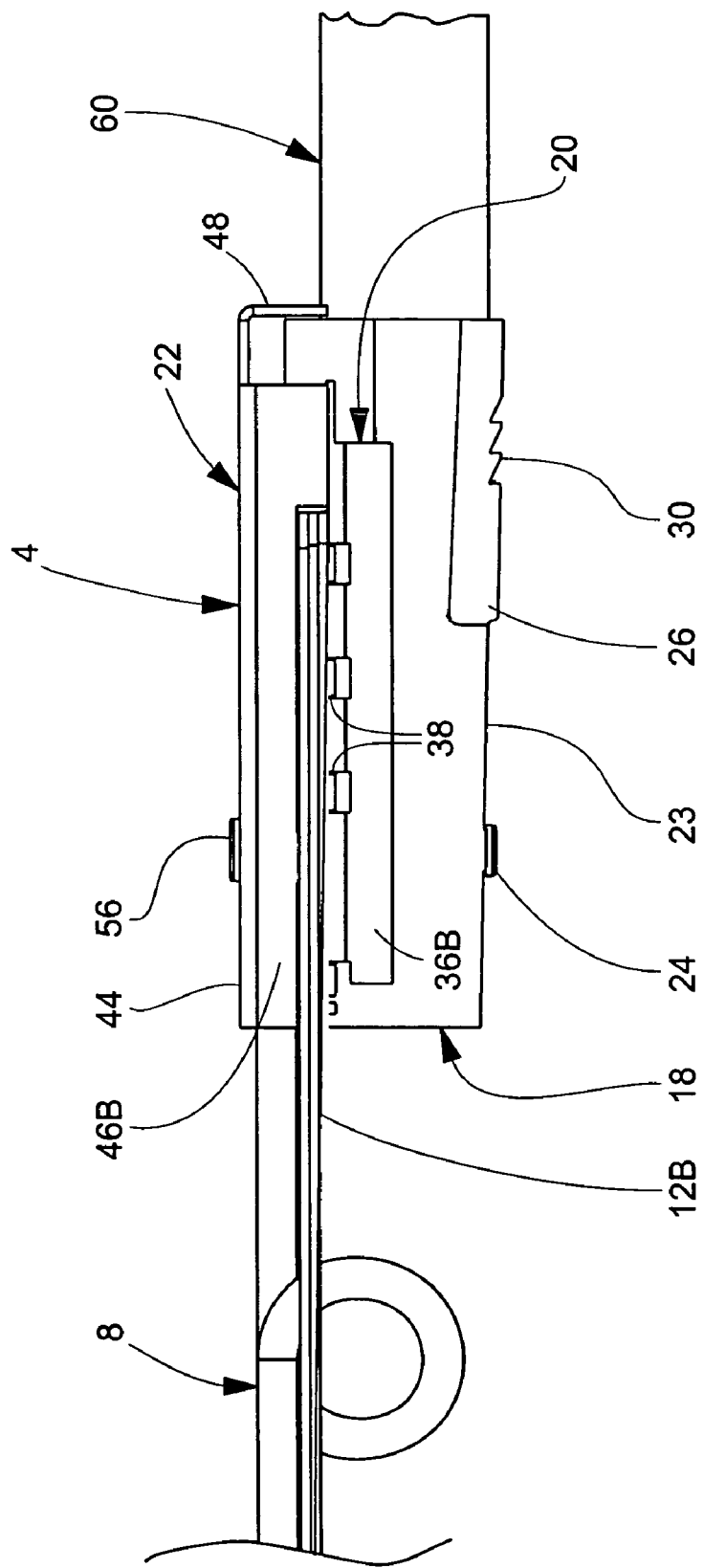
FIG. 2 is a fragmentary side view in elevation.
Figure 3:
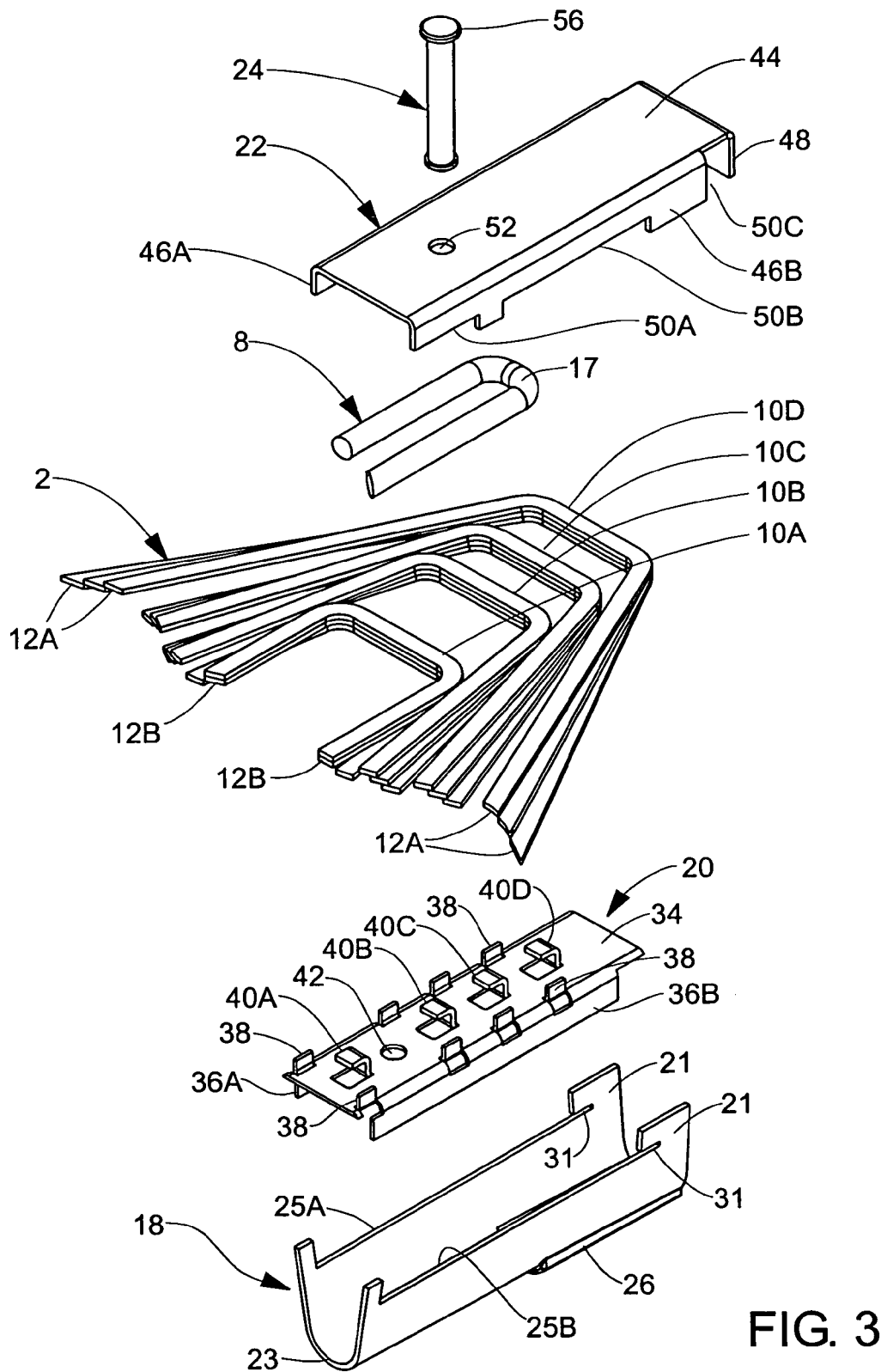
FIG. 3 is an exploded view of the socket, including fragments of the dual tine members.
Figure 6:
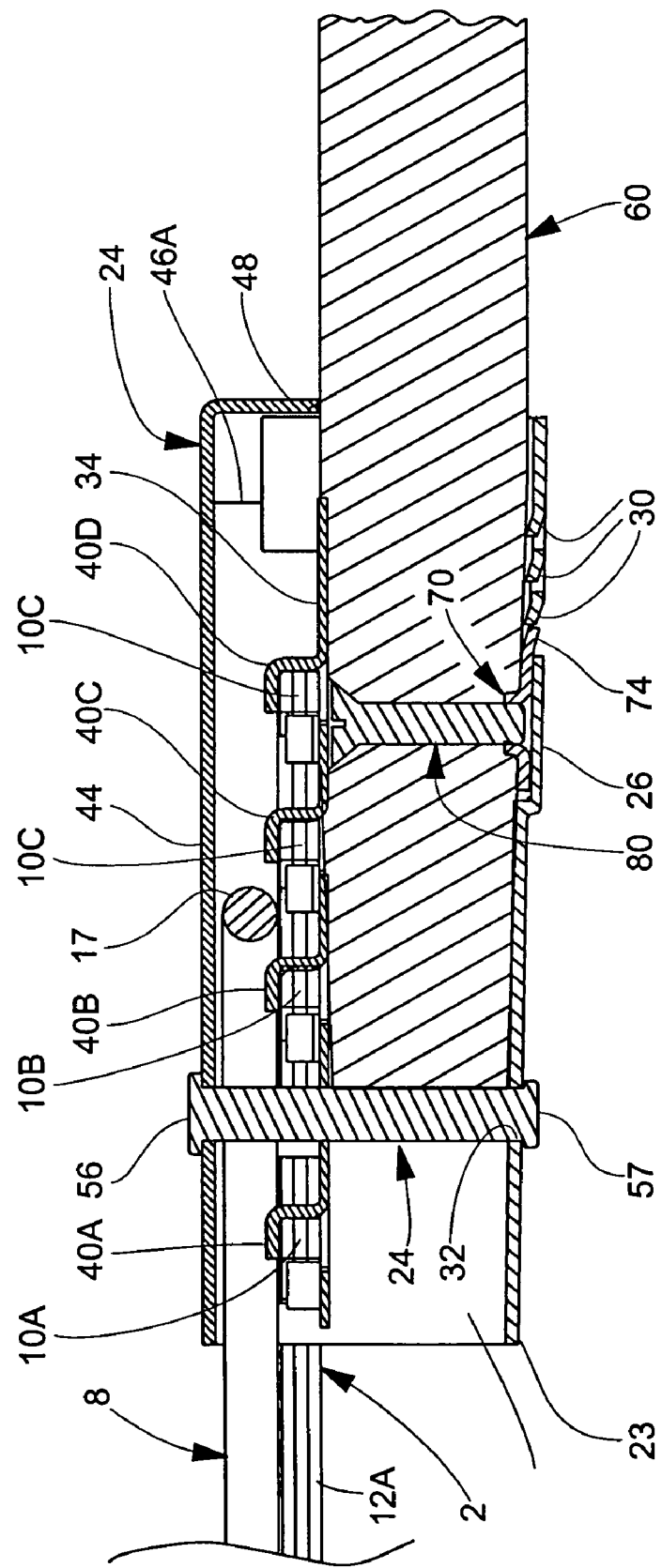
FIG. 6 is a sectional view, taken along line 6-6 of FIG. 5.
Figure 8:
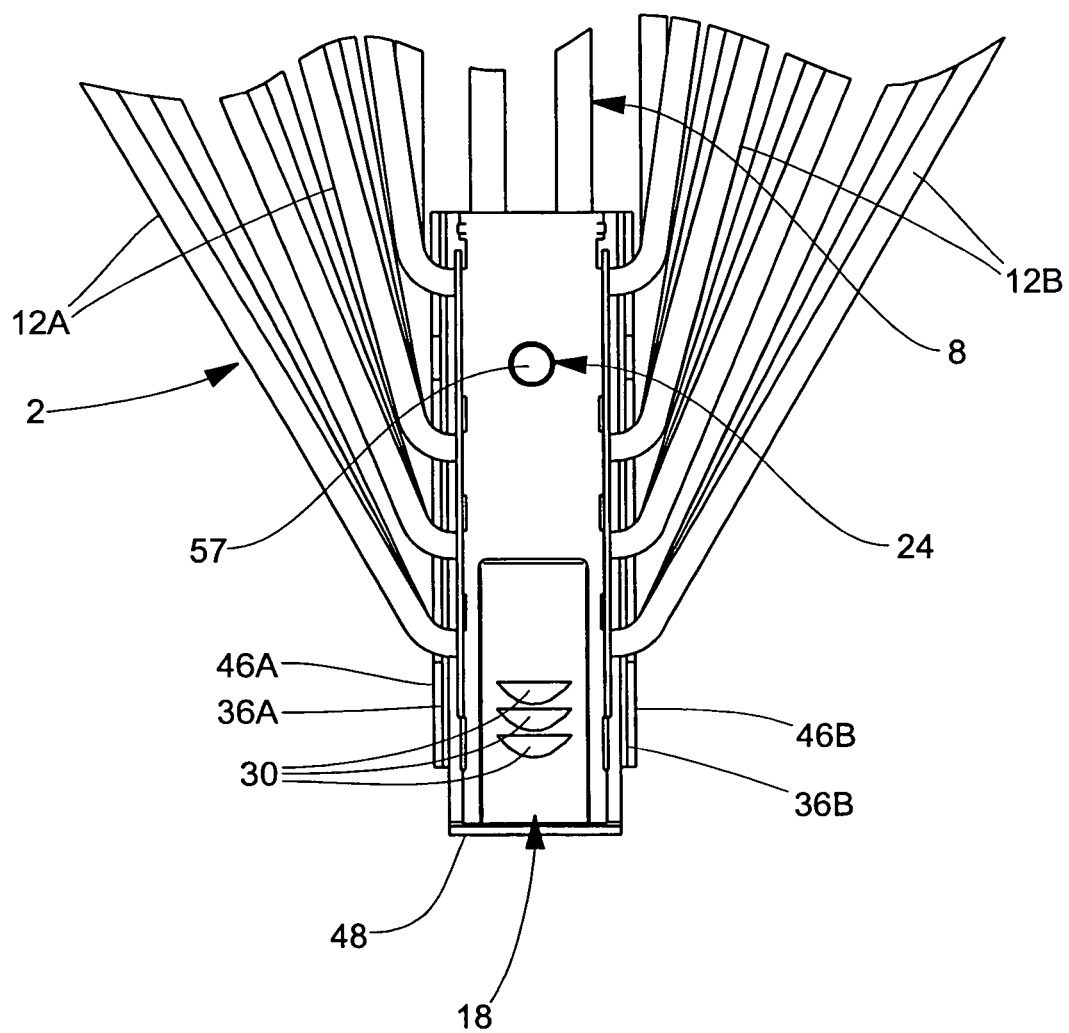
FIG. 8 is a fragmentary bottom view of the rake head.

Referring now to FIG. 3, the socket is made up of four parts made of sheet metal (e.g., steel or aluminum) of appropriate thickness and identified by the numerals 18, 20, 22 and 24. Socket part 18 is U-shaped in cross-section, having opposite relatively flat side wall sections 21 and a circularly curved center wall section 23 that generally follows the curvature of the surface of the pole that is intended to serve as the rake handle. The longitudinal edges of sidewall sections 21 of socket part 18 are notched as shown at 25A and 25B. In addition, a portion of the curved wall section 23 is deformed to define a raised section 26 at one end of part 18. That raised section 26 has been punched out to form a series of inwardly facing teeth 30 (FIGS. 2, 6 and 8). Curved wall section 23 also has a hole 32 (FIG. 6), and sidewall sections 21 have slots 31 (FIG. 3).

Still referring to FIG. 3, socket part 20 comprises a flat plate section 34 and two opposite side walls 36A and 36B that extend at a right angle to plate section 34. Socket part 20 also is formed with two sets of tabs 38 that are punched out of its sidewalls and project at substantially a right angle to plate section 34. Tabs 38 extend in two rows, one along each of the opposite side edges of plate section 34. Each row consists of four tabs 38. In addition four L-shaped locking tabs 40A, 40B, 40C, 40D are punched out of plate section 34. Tabs 40A, 40B, 40C, 40D are in alignment along the longitudinal center line of part 20. Plate section 34 also has a hole 42 therethrough.

Socket part 22 consists of a flat plate body section 44, two sidewalls 46A and 46B, and an end wall 48. The sidewalls 46A and 46B are notched as indicated at 50A, 50B and 50C. Plate section 44 has a hole 52. Socket part 24 is a rivet that is used to secure parts, 18, 20 and 22 to one another in captivating relation with the center sections of the dual tine members and the rear section of spring member 8 as hereinafter described.

Referring again to FIG. 3, as noted above, the dual tine members 2 are arranged in groups 12A, 12B in accordance with prior practice. The total number of dual tine members 2, the number of groups into which they are arranged, the number of dual tine members in each group, and the lengths, angles of divergence and shape of the tines may be varied and is not critical to the present invention. In each group, the center sections 10A, 10B, 10C, 10D of the tine members are aligned with one another. The center section 10A of the innermost group of tine members extends between and is captivated between the first (forward-most) pair of side tabs 38, and in the first (forward-most) locking tab 40A. The center section 10B of the next group of tine members extends between and is captured between the next-in-line side tabs 38 and the next-in-line locking tab 40B. Similarly, the center sections 10C and 10D of the third and fourth groups of dual tine members extend between and are captivated by successive pairs of side tabs 38 and successive locking tabs 40C and 40D. The rear section 17 (FIG. 6) of spring 8 is captured between socket part 24 and underlying portions of some of the dual tine members 2 (FIG. 6).

Figure 7:
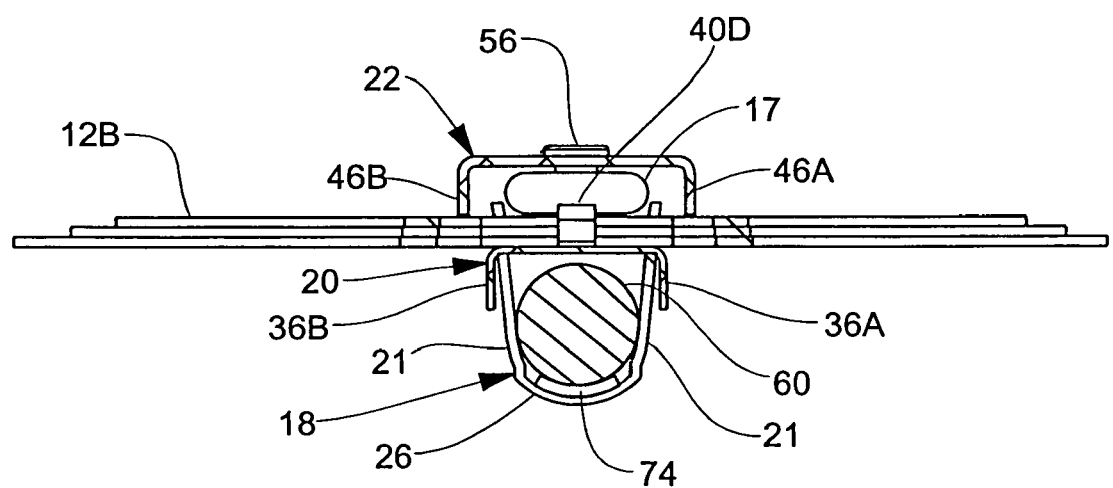
FIG. 7 is a sectional view taken along the line the 7-7 of FIG. 5.

Referring now to FIGS. 2, 3 and 7, socket part 20 sits on the longitudinal edges 25A, 25B of part 18 (FIG. 3), with its sidewalls 36A, 36B extending alongside of and engaging the outer surfaces of sidewall sections 21 of the socket part 18 and the rear section of its plate section 34 extending into slots 31 of the socket part 18. Socket part 22 overlies socket part 20 and the center sections 10A, 10B, 10C, 10D of dual tine members 2 and the rear section 17 of spring member 8, with its sidewalls 46A and 46B overlapping sidewalls 36A and 36B, respectively, of socket part 20. A rivet 24 extends through holes 32, 42 and 52 (FIGS. 3 and 6) in parts 18, 20 and 22, respectively. The flanged head 56 of the rivet 24 overlaps and engages plate section 44 (FIGS. 3 and 6) of part 22; the opposite end of the rivet is swaged over the outer surface of part 18 as shown at 57 (FIG. 6), thereby securing together the socket parts 18, 21 and 22 (FIG. 7) in capturing relation with the center sections 10A, 10B, 10C, 10D (FIG. 6) of all the dual tine members and the rear section 17 of spring member 8. Alternatively, the rivet could be replaced by some other form of pin-like fastener, e.g., a bolt and nut.

Figure 4:
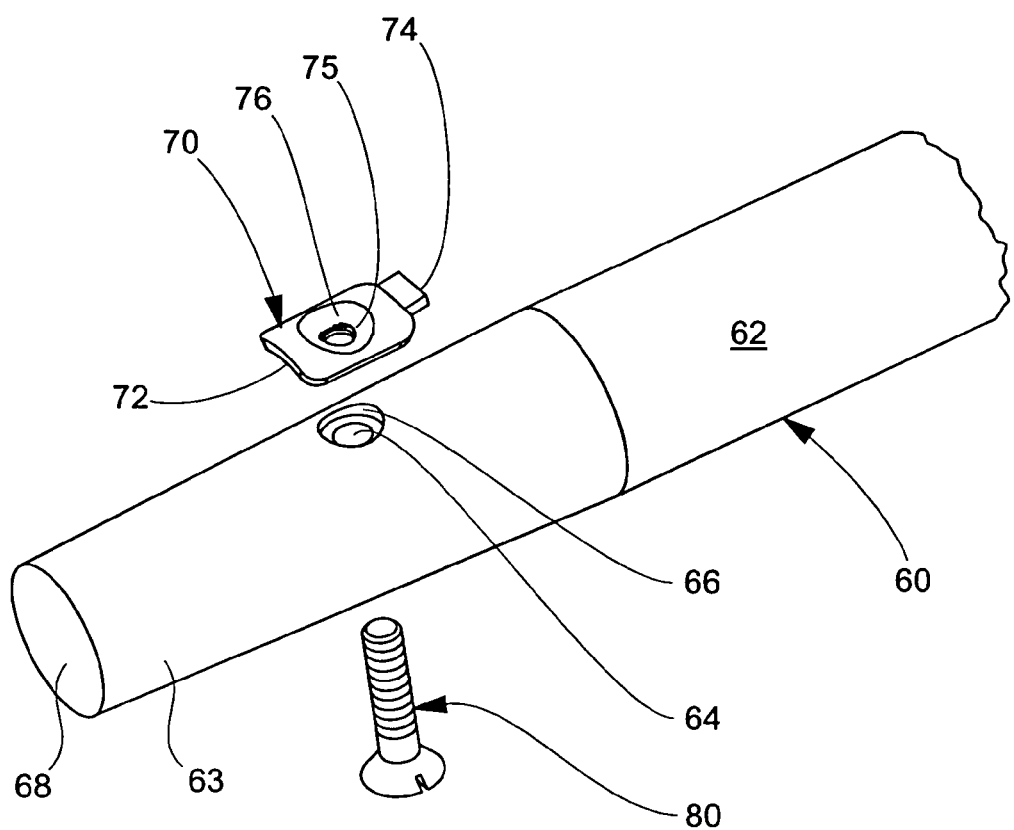
FIG. 4 is an exploded perspective view of the front end of a pole that serves as a handle, and the detent member that locks the pole to the socket.
Figure 5:
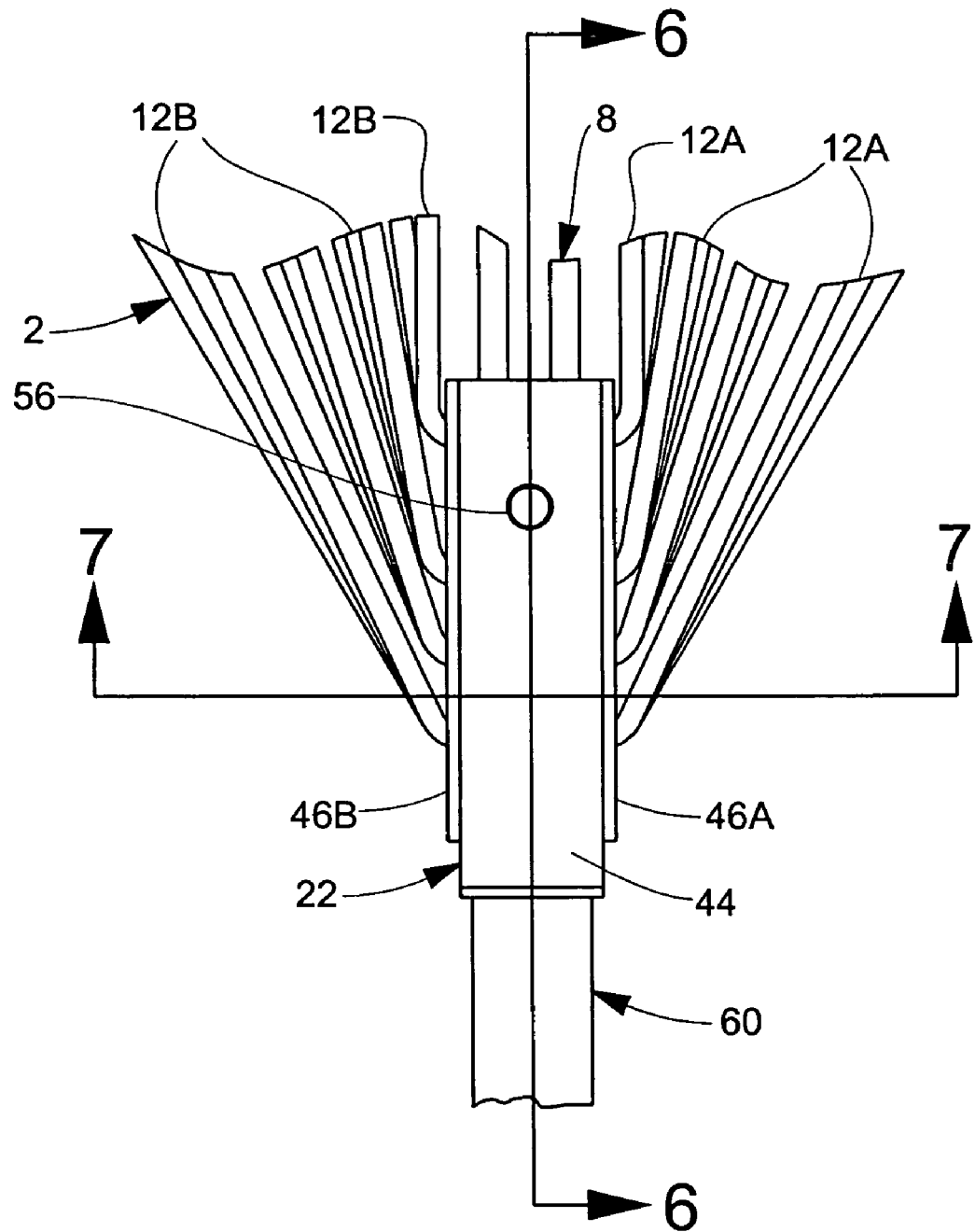
FIG. 5 is an enlargement of a portion of FIG. 1.

Referring now to FIG. 4, a handle for the rake is provided in the form of an elongate pole 60 of suitable length, e.g., 60-72 inches. For convenience, only the front end portion of pole 60 is illustrated. The pole has a circular outer surface 62. Preferably, but not necessarily, the pole is formed with a front end section 63 that is tapered to a smaller diameter than the remainder of the pole. The front end section of the pole is provided with a through hole 64. Preferably, hole 64 is countersunk, as shown at 66 in FIG. 4. Associated with the pole is a detent 70 which comprises a base portion 72 and an angular tongue section 74. Base portion 72 preferably is contoured to mate with the curved outer surface 62 of the pole and has is provided with a threaded hole 75. Preferably, detent base portion 72 is deformed around hole 75, as shown at 76, so as to seat snugly in countersink 66. A screw fastener 80 is inserted through hole 64 and screws into hole 75 and functions to secure detent 70 to pole 60. The detent is oriented so that its tongue section 74 extends away from the front end surface 68 of the pole.

With the foregoing construction, attachment of pole 60 to the rake head is a simple matter of inserting the front end of the pole into socket 4 with detent 70 aligned with the teeth 30 of socket part 18. As the pole is inserted, the detent will pass by one or more of the teeth 30 until the front end surface 68 of the pole engages and is stopped by rivet 24. Preferably, holes 32, 42 and 52 are located along the center lines of the surfaces in which they are formed, so that rivet 24 intersects the center axis of the socket. The detent 70 is located on pole 60 so that its tongue section 74 will be engaged with one of the teeth 30 when the pole engages, or is in near engagement, with rivet 24, with the result that the pole will be locked to the socket by the detent/tooth interaction. Thereafter, the pole cannot be pulled out of the socket without destroying the detent and/or one or more of the teeth 30. Thus, the invention provides a quick and strong connection between the pole and rake head.

Of course the invention is not limited to the specific embodiment herein illustrated and described. Also, dual tine members 2 and some or all of the parts of the socket could be made of a strong plastic material, e.g., a fiber-reinforced plastic. The number and shape of tabs 38 and 40 also may be modified without altering their function. The mode of making a quick and secure connection can be incorporated into other sockets designed for rakes, shovels and other tools that require an elongate pole-like handle. Also, the handle could be made of a material other than wood, e.g. aluminum or a fiber-reinforced plastic. Still other modifications and advantages of the invention will be obvious to persons skilled in the art.

What is claimed is:

1. A quick connect tool assembly, the assembly comprising (1) a tool head having a socket therein at one end thereof and (2) a handle in the form of an elongated pole for insertion into the socket, said quick connect assembly further comprising:
   a detent attached to a peripheral surface of said the elongated pole adjacent a forward end of the pole, said detent having a tongue section that projects from the peripheral surface of the pole, and
   the socket being provided with an axial row of teeth projecting into an interior thereof, the teeth being shaped to allow the detent tongue section to pass axially over the teeth toward said tool head when the pole is inserted axially into the socket and to allow the detent tongue section to engage one of the teeth so as to prevent the pole from pulling out of the socket;
   wherein the socket comprises a first part provided with a generally U-shaped cross-sectional configuration and first and second parallel and mutually-spaced longitudinal edges, and a second part engaged with and extending between the first and second longitudinal edges of said first part, said first and second parts coacting to define an interior space of the socket with the interior space being sized to accommodate a forward end of the pole;
   wherein said tool head comprises a rake head having a plurality of tine members and adapted to be attached to the socket between said first and second parts; and
   wherein the tine members comprise flat strips of metal bent intermediate their ends so that each tine member comprises a center section and elongated first and second tine sections that are attached to and disposed in converging relation with said center section, and further wherein the socket includes a third part overlying said second part, with said center section of each tine member being captivated between said second and third parts of the socket.

2. The tool assembly according to claim 1 wherein the socket includes a rivet disposed therein for limiting the extent to which the pole can be inserted into the socket.

3. The tool assembly according to claim 1 wherein the rivet is secured to and extends between said first and second parts of the socket.

* * * * *